United States Patent
Crofoot

(10) Patent No.: US 7,798,440 B2
(45) Date of Patent: Sep. 21, 2010

(54) DUAL LINE FLY FISHING REEL

(75) Inventor: James Crofoot, Bend, OR (US)

(73) Assignee: JC Technologies Inc., Redmond, OR (US)

( * ) Notice: Subject to any disclaimer, the term of this patent is extended or adjusted under 35 U.S.C. 154(b) by 130 days.

(21) Appl. No.: 12/008,995

(22) Filed: Jan. 14, 2008

(65) Prior Publication Data

US 2009/0179100 A1 Jul. 16, 2009

(51) Int. Cl.
*A01K 89/02* (2006.01)
(52) U.S. Cl. .................. 242/322; 242/317; 242/318
(58) Field of Classification Search ............ 242/317, 242/318, 322
See application file for complete search history.

(56) References Cited

U.S. PATENT DOCUMENTS

| 2,535,746 | A | * | 12/1950 | Mitchell | ............... 242/229 |
|---|---|---|---|---|---|
| 3,186,656 | A | * | 6/1965 | Venable | ............... 242/321 |
| 4,076,185 | A | * | 2/1978 | Dorph | ............... 242/118.41 |
| 4,418,877 | A | * | 12/1983 | Nakajima | ............... 242/319 |
| 5,161,751 | A | * | 11/1992 | Bolcavage | ............... 242/322 |
| 6,382,545 | B1 | * | 5/2002 | Yeh | ............... 242/317 |
| 6,412,724 | B1 | * | 7/2002 | Ferrara, Jr. | ............... 242/322 |
| 6,467,712 | B1 | * | 10/2002 | Cribb | ............... 242/322 |
| 6,938,847 | B1 | * | 9/2005 | Yeh | ............... 242/322 |
| 2005/0194485 | A1 | * | 9/2005 | Yeh | ............... 242/322 |

* cited by examiner

*Primary Examiner*—Emmanuel M Marcelo
(74) *Attorney, Agent, or Firm*—Kolisch Hartwell, P.C.

(57) ABSTRACT

A fly reel having a spool with multiple line holding portions, permitting a single rod an reel assembly to be simultaneously fitted with different types of fly line, and eliminating the need to remove and reinstall reels when changing types of fly line.

18 Claims, 4 Drawing Sheets

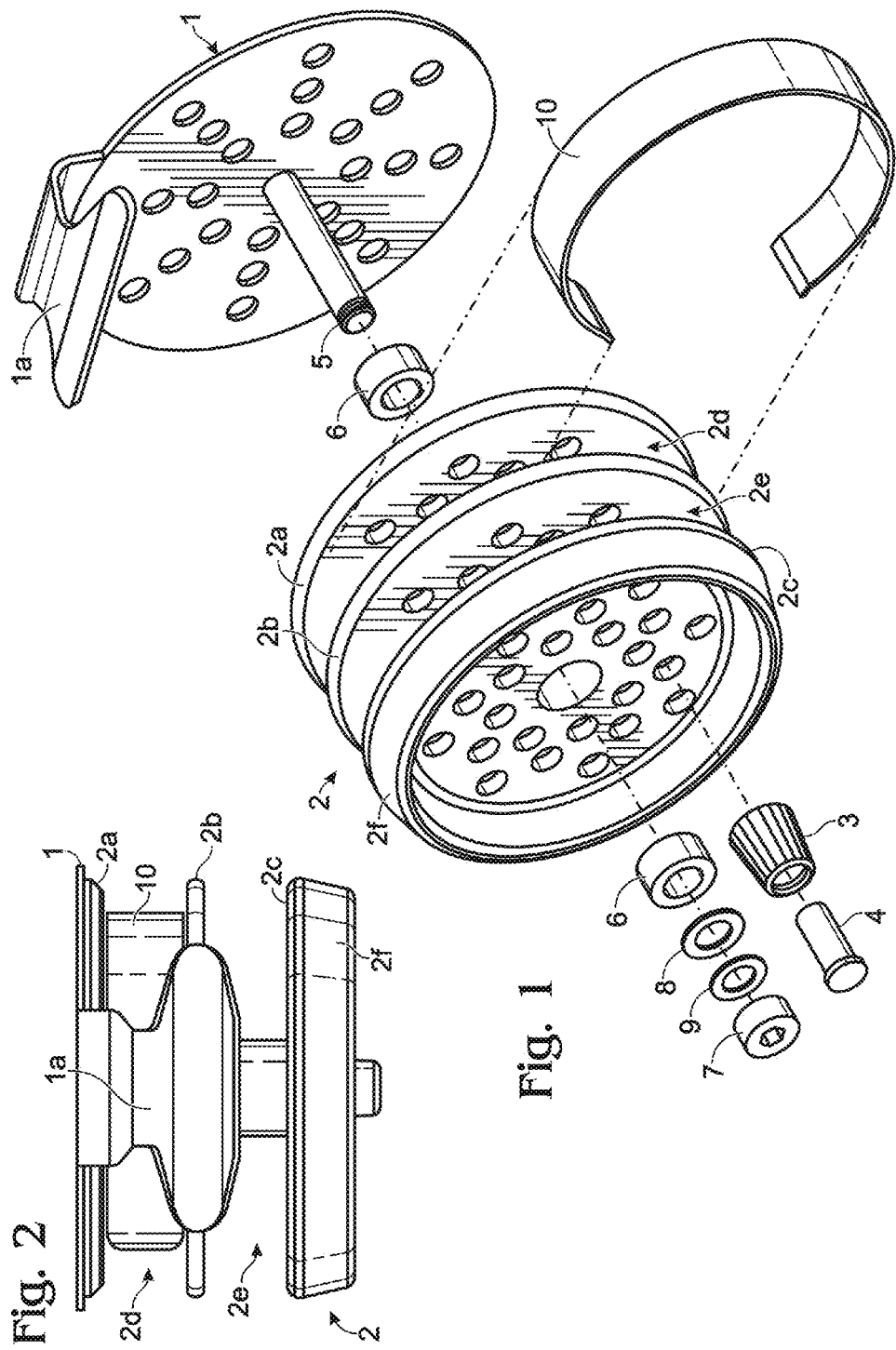

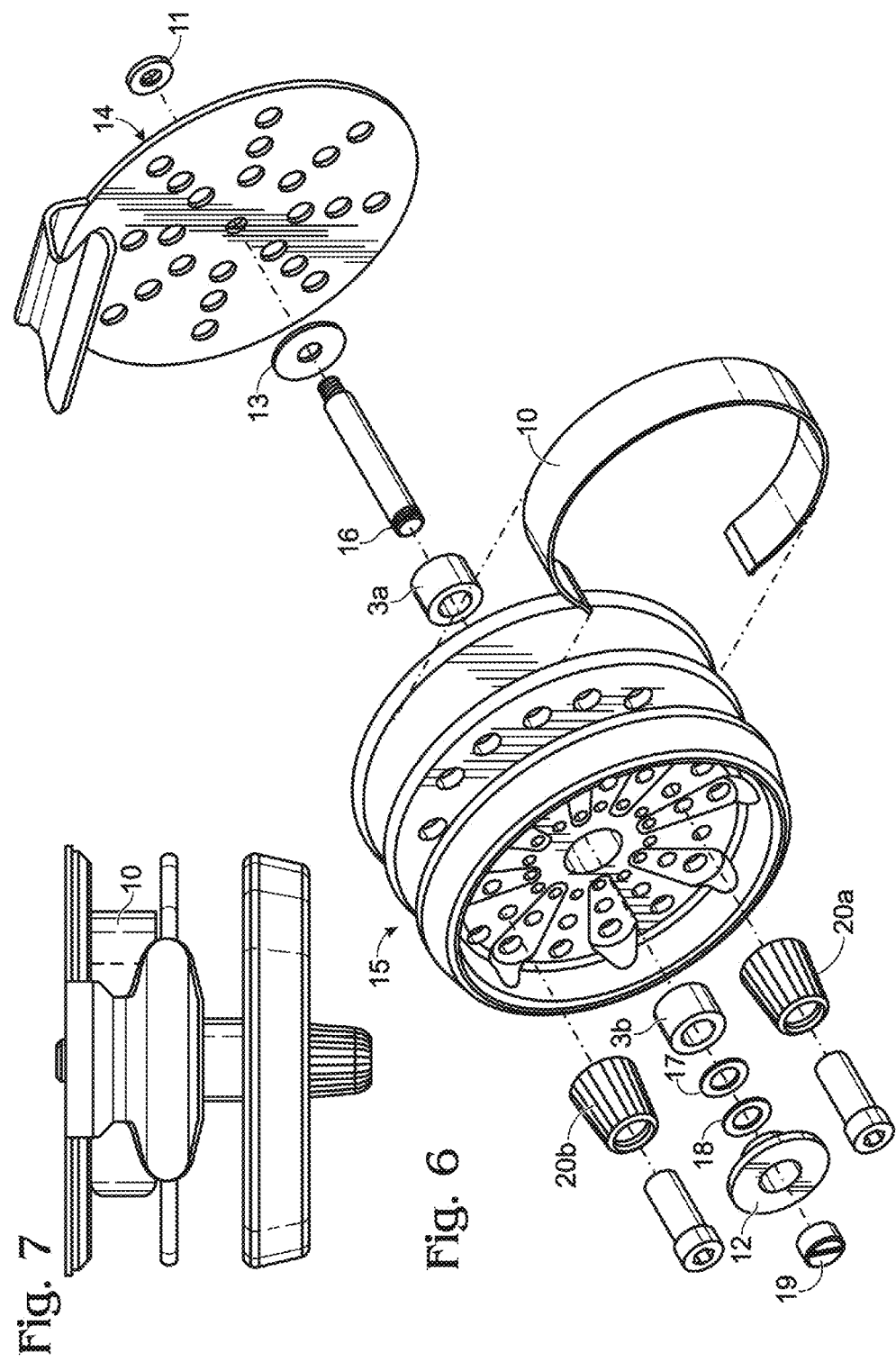

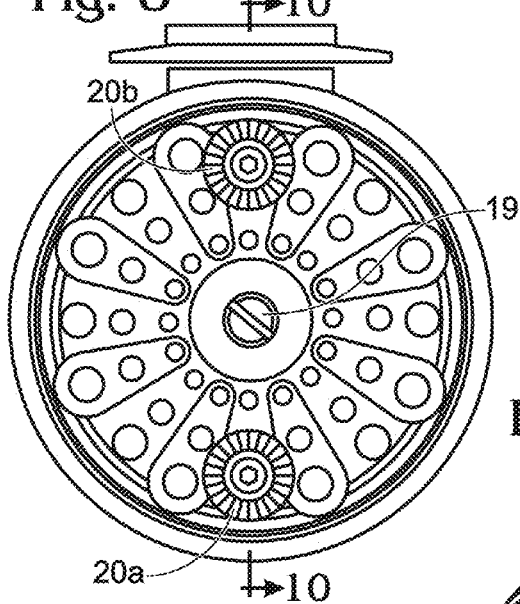
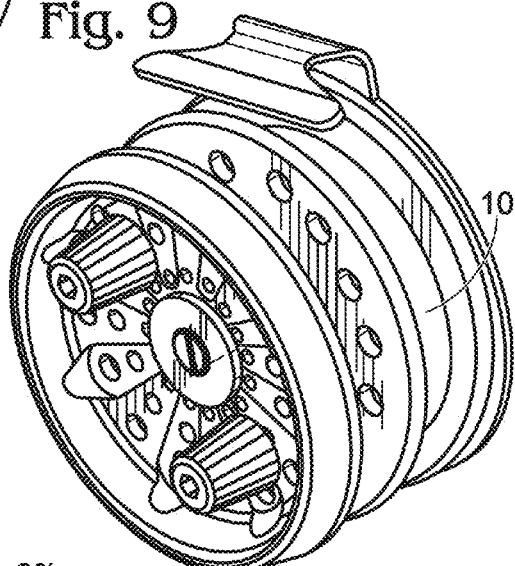
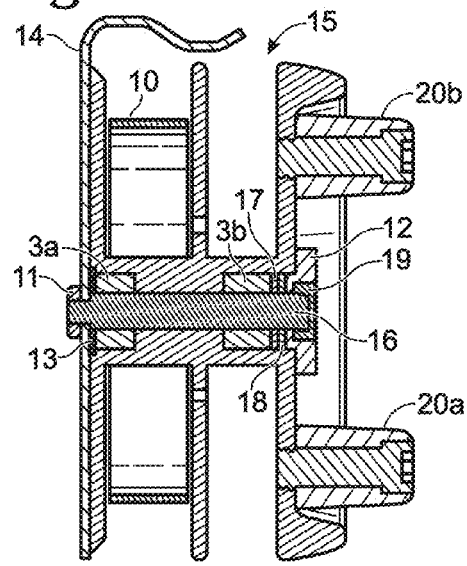

DUAL LINE FLY FISHING REEL

BACKGROUND

This invention relates to fishing reels, and in particular to fly fishing reels. Fly fishing reels are a well known and specialized form of fishing reel. Fly fishing differs from other styles of fishing in the manner in which the lure, or fly, is cast. In spinning or casting reels, a relatively lightweight line is wound onto a free wheeling spool, and a relatively heavy lure or bait is attached to the end of the line. The lure or bait is delivered by "whipping" the end of the rod toward the target and releasing a brake on the spool at the appropriate time. The whipping action of the rod propels the lure or bait toward the target, carrying the line with it.

Fly fishing reels and lines operate in a different manner. In fly fishing the lure is very light, and does not have enough mass to be effectively thrown by the whipping action of the rod. Instead, a relatively heavy fly line is wound onto reel, and played out incrementally by a repeated whipping of the rod tip toward the target. The rod is moved in a rhythm that keeps the end of the line and the fly in the air until enough of the fly line is extended to reach the target. The rod is then stopped and the fly line and fly settle onto the water.

Fly fishing lines can be of two basic types, floating and sinking. A commonly used hybrid line includes a sinking end portion attached to a floating length to cause the bulk of the line to remain on the surface while permitting the end portion to deliver the fly to a target beneath the surface of the water. A fly reel is loaded with either floating or sinking line depending on the particular conditions. If during an outing the conditions change, or the particular type of line is not working, the fisherman removes the reel and replaces it with one that is loaded with the opposite type of line. While this works, it is inconvenient at best.

SUMMARY OF THE INVENTION

This invention relates to a fly reel that eliminates the need to change reels when switching from one type of fishing line to another. The reel is fitted with two spools that each can be loaded with different types of fly line, permitting the fisherman to switch between the line-types more quickly and easily without having to remove and replace one reel with another. The invention will now be described in greater detail by reference to the drawings.

BRIEF DESCRIPTION OF THE DRAWINGS

FIG. 1 is an exploded perspective view of a reel according to a preferred embodiment of the invention.

FIG. 2 is a top view of the embodiment shown in FIG. 1.

FIG. 6 is an exploded perspective view of a reel according to a second preferred embodiment of the invention.

FIG. 7 is a top view of the embodiment shown in FIG. 6.

FIG. 8 is a side elevational view of the embodiment shown in FIG. 6.

FIG. 9 is a side perspective view of the embodiment shown in FIG. 6.

FIG. 10 is a side cross-sectional view along line 10-10 in FIG. 8.

DETAILED DESCRIPTION

Figure 3:
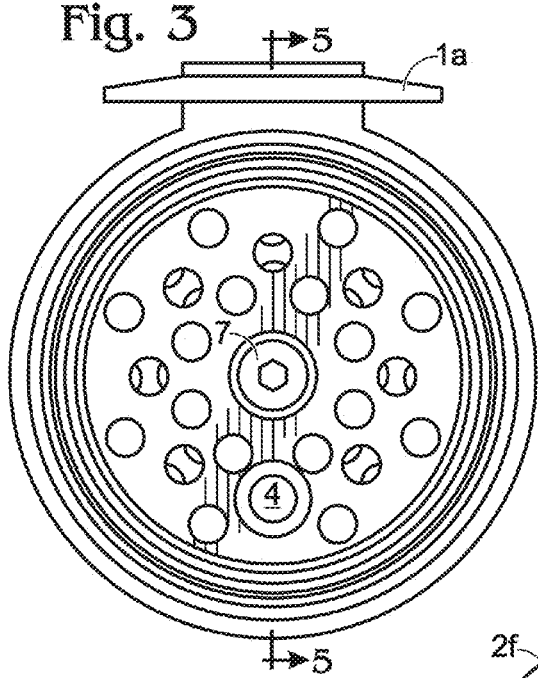
FIG. 3 is a side elevational view of the embodiment shown in FIG. 1.
Figure 4:
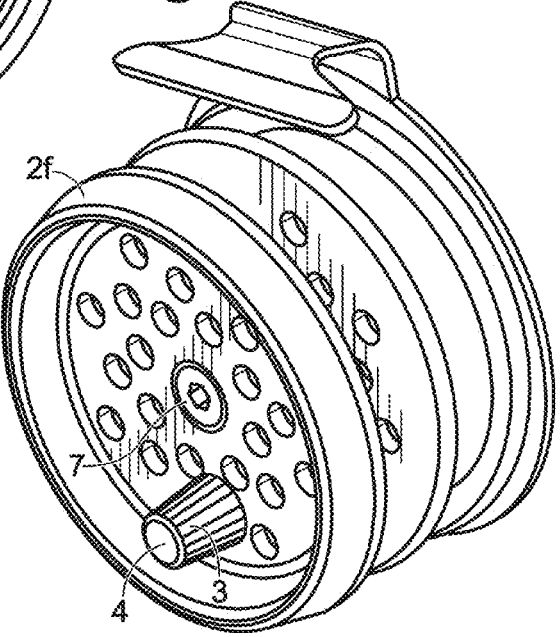
FIG. 4 is a side perspective view of the embodiment shown in FIG. 1.
Figure 5:
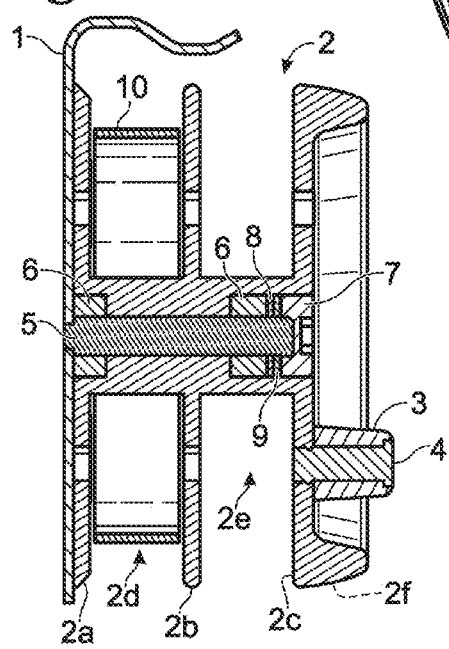
FIG. 5 is a side cross-sectional view along line 5-5 in FIG. 3.

Referring now to the FIG.'s 1-5, one preferred embodiment of the invention is shown in an exploded view. In this embodiment the invention includes a reel housing 1 which includes a threaded stud 5 and a mounting flange 1a. A spool 2 is mounted on stud 5 and rotates on a pair of inner and outer bushings 6. In one preferred embodiment bushings 6 are self-lubricated, or made of a low friction material such as a Teflon®. Doing so eliminates the need to lubricate the spool, increasing its usability in the field.

Spool 2 includes an inner flange 2a, a middle flange 2b, and an outer flange 2c. Inner flange 2a and middle flange 2b define a first line spool portion 2d. Middle flange 2b and outer flange 2c define a second line spool portion 2e. A braking surface 2f is provided on the peripheral surface of outer flange 2c.

A handle knob 3 is mounted on spool 2 by pin 4. A first washer 8 and a spring washer 9 are mounted on stud 5, and the whole rotating assembly is retained on stud 5 by a retaining nut 7.

In operation the reel is mounted on a rod at flange mounting flange 1a in typical fashion. A first fly line is wound onto first line spool portion 2d, and a second fly line is wound onto second line spool portion 2e. One of the lines is threaded through the line guides of the fishing rod for use in a normal fashion, while the other is retained on the spool by a resilient line retainer 10. If the conditions arise that require the use of the different line on the other spool, the first line is rewound onto the first line spool portion 2d. The retainer 10 is moved from the line on the second line spool portion to the line on the first line spool portion, and the other fly line is extended and threaded through the line guides for use.

It is often the case when fly fishing that the momentum of the fly line as it is thrown can result in an over spinning of the spool and cause tangling of the line. This is referred to as backlash. In this embodiment of the invention retaining nut 7 and spring washer 9 cooperate to preload a frictional force on spool to limit the over spinning of the spool. Nut 7 is adjustable to provide a continuously variable range of adjustment as required for different line weights and rods. In addition to the preloading provided by the retaining nut and spring washer, the spool in includes an angles shoulder portion 2f that serves as a "braking surface." As the line is thrown, the user's heel of the user's hand is gently pushed against shoulder 2f to slow the spinning spool, and in that way to accurately place the lure at the desired position. The angle and position of the braking shoulder 2f is such that the user can conveniently brake or slow the spinning spool with the heel of his hand while holding the rod in the normal fashion.

In one preferred embodiment the reel housing and spool assembly are manufactured in a lightweight, non-corroding metal such as aluminum or titanium, permitting the reel to be used in salt water environments without danger of corroding. However, the invention is not limited to any particular material of construction, and could be made of other metallic or polymeric materials. In another aspect of this embodiment of the invention, the reel housing and spool flanges are drilled with numerous holes to further lighten the assembly and increase the sensitivity of the fly rod and reel, although the invention is not so limited.

In another preferred embodiment as shown in FIGS. 6-10, the reel operated in a similar manner. This embodiment differs in the design of the shaft and retainers used to mount the spool onto the shaft. Referring to FIG. 6 shaft 16 is mounted on reel housing 14 by means of washer 13 and shaft retaining nut 11. Spool 15 is mounted on shaft 16 by means of respective inner and outer bushings 3a and 3b. D-hole washer 17, spring washer 18, tension control washer 12 and spool retaining nut 19. The tension on tension control washer 12 is adjusted by means of turning spool retaining nut 19 to tighten or loosen tension control washer 12 on shaft 16. Tension is transmitted from tension control washer 12 to spool 15 through tension spring 18. Spool retaining nut 19 can be adjusted to provide any level of spool rotation resistance desired. This embodiment also differs from the first preferred embodiment in that a pair of spool turning knobs 20a and 20b are provided, as opposed to a single knob.

Having described the invention by reference of several preferred embodiments, it will be apparent to those of skill in the art that the illustrated embodiments could be varied in detail and arrangement without departing from the scope of the claims.

The invention claimed is:

1. A fishing reel comprising:
   a backing plate;
   a shaft mounted on the backing plate;
   a spool rotatably mounted on the shaft, the spool including first second and third radial flanges;
   a first line recess defined by the first and second radial flanges;
   a second line recess defined by the second and third radial flanges; and,
   a peripheral drag surface including a braking shoulder on the third flange operable to exert a drag force on the spool responsive to pressure applied thereto.

2. A fishing reel according to claim 1 further comprising a rod mounting flange extending from the backing plate.

3. A fishing reel according to claim 1 further comprising an operable drag preload engaged with the spool.

4. A fishing reel according to claim 3 wherein the operable drag preload includes a resilient member operable to apply a drag force to the spool responsive to a clamping force applied thereto.

5. A fishing reel according to claim 1 further comprising a knob mounted on the third flange.

6. A fishing reel according to claim 1 further comprising a first fishing disposed in the first line recess.

7. A fishing reel according to claim 6 further comprising a second fishing line disposed in the second line recess.

8. A fishing reel according to claim 6 further comprising a line retainer removeably engaged with the first fishing line.

9. A fishing reel according to claim 6 further comprising a line retainer removeably engaged with the second fishing line.

10. A fishing reel according to claim 1 further comprising a pair of knobs mounted on the third flange.

11. A fishing reel comprising:
    a backing plate;
    a shaft mounted on the backing plate;
    a spool rotatably mounted on the shaft, the spool including first second and third radial flanges;
    a first line recess defined by the first and second radial flanges;
    a second line recess defined by the second and third radial flanges; and,
    a peripheral drag surface on the third flange operable to exert a drag force on the spool responsive to a force applied thereto;
    a rod mounting flange extending from the backing plate; and,
    an operable drag preload engaged with the spool, the operable drag preload including a resilient member operable to apply a drag force to the spool responsive to a clamping force applied thereto.

12. A fishing reel according to claim 11 further comprising a knob mounted on the third flange.

13. A fishing reel according to claim 11 further comprising a first fishing disposed in the first line recess.

14. A fishing reel according to claim 13 further comprising a second fishing line disposed in the second line recess.

15. A fishing reel according to claim 14 further comprising a line retainer removeably engaged with the second fishing line.

16. A fishing reel according to claim 13 further comprising a line retainer removeably engaged with the first fishing line.

17. A fishing reel according to claim 11 wherein the operable drag preload engaged with the spool includes a threaded member mounted on the shaft and operable to apply a variable clamping force to the spool.

18. A fishing reel comprising:
    a spool rotatably mountable to a shaft, the spool including first, second, and third radial flanges;
    a first line recess defined by the first and second radial flanges configured to receive a first line; and
    a second line recess defined by the second and third radial flanges configured to receive a second line not connected to the first line,
    a first fishing line disposed in the first line recess, and a second line, not connected to first line, disposed in the second line recess, and
    a line retainer removeably engagable with the first line.

* * * * *